United States Patent Office 2,897,160
Patented July 28, 1959

2,897,160

HYDROGENATION CATALYST

Harold W. Fleming, Louisville, and Ronald E. Reitmeier, Anchorage, Ky., assignors to Chemetron Corporation, a corporation of Delaware No Drawing. Application February 10, 1958
Serial No. 714,052

6 Claims. (Cl. 252—455)

This invention relates generally to the hydrogenation of unsaturated hydrocarbons and especially to the selective hydrogenation of acetylenic hydrocarbons in gas mixtures containing olefins and hydrogen. More particularly, the invention involves an improved cobalt-molybdena catalyst for such reactions.

This application is a continuation-in-part of our copending application Serial Number 494,814, filed March 16, 1955, now abandoned.

Acetylenic hydrocarbons, because of the relative instability of their triple bond, may be hydrogenated more readily than hydrocarbons containing double bonds, and selective hydrogenation of acetylene in a gas mixture containing olefins is possible by utilization of a catalyst of appropriate activity to cause the hydrogenation of acetylene to occur at a much greater rate than the hydrogenation of the olefins. Such selective hydrogenation poses a difficult problem, however, when only small amounts of acetylene are present in the gas mixture and when it is necessary to completely hydrogenate the acetylene without appreciably lowering the olefin content in order to produce a gas mixture suitable for use as a synthetic intermediate. By way of example, gas mixtures consisting essentially of olefins and hydrogen for the production of polyethylene in general should not contain more than about 25 parts of acetylene per million parts of the mixture. Mixtures containing higher acetylene concentrations have been found to be unsuitable for the polymerization reaction.

An important object of this invention is to provide a catalyst which is capable of hydrogenating small amounts of acetylenes in gas mixtures in such manner that the reaction proceeds virtually to completion at a high velocity to reduce the acetylenes content to a few parts per million, and, since any olefins which are hydrogenated in a gas mixture containing same are effectively lost, a related object is to provide an acetylene hydrogenation catalyst which is relatively inactive in promoting hydrogenation of olefins even in mixtures containing a major proportion of olefins.

Although gas mixtures containing ethylene and other olefins derived by thermal cracking of alkanes usually are substantially sulfur free, it is desirable in many refinery operations to add other refinery gases which contain olefins to such gas mixtures when producing ethylene. Such other refinery gases usually contain sulfur compounds, and, since such other gases are added in varying amounts from time to time, the sulfur content of the resulting olefin containing mixture may vary from substantially zero to a considerable amount. Moreover, the sulfur is frequently encountered in the form of compounds such as carbonyl sulfide (COS) which are quite difficult to remove by conventional methods such as amine solution scrubbing.

Accordingly, another important object of this invention is to provide a selective hydrogenation catalyst which is both active and selective for hydrogenating impurities in gas streams containing various amounts of sulfur compounds and which will also promote the hydrogenation of sulfur compounds such as carbonyl sulfide to yield compounds which may be more readily removed.

We have discovered that a superior selective catalyst may be readily formed by incorporating cobalt-molybdena upon a carrier comprising hydraulic cement, ball clay and alumina which may be reduced to activate the cobalt-molybdena. We have further discovered that if the catalyst is to be both selective and sufficiently active to completely hydrogenate the acetylenic compounds at a commercially feasible rate, that the relative amount of the cobalt-molybdena must be maintained within a particular range. Moreover, the particular carrier material which we utilize has been found to be especially suitable in that it will withstand the rigorous regenerative procedure to which the catalyst must be subjected every few weeks in order to remove polymer deposits without loss of mechanical strength or impairment of catalyst activity or selectivity.

The catalytically active material of our improved catalyst preferably is a form of cobalt-molybdena complex having a mol ratio of cobalt to molybdenum of approximately 1 to 1. Upon reduction X-ray diffraction studies have indicated that this reduced material had a spinel crystal form, i.e., the crystal form is close packed cubic or face centered cubic with oxygen atoms at the cornices and face centers and metal atoms in the interstices. The exact composition of the reduced material is not known, but the X-ray patterns could be explained by the formula $Co_2MoO_4$ or possibly an inverse spinel, namely, $Mo_2CoO_4$ being present. The lattice constant is approximately 8.46 angstroms and comparison of this value with other crystals of known composition and formula induced the belief that the $Co_2MoO_4$ was present. Combinations of this material and precipitated or impregnated oxides of cobalt or molybdenum are also suitable. Alternatively, intimate mixtures of cobalt and molybdenum oxides, such as are formed by coprecipitation or impregnation upon a carrier and calcination, having other mol ratios than 1 to 1 may be employed with satisfactory results.

The ratio of cobalt to molybdenum in the catalyst is not particularly critical and, although the 1 to 1 ratio is preferred, ratios varying between about 3 to 1 and about 1 to 3 may be employed to advantage particularly when the relative percentage of active material in the catalyst is high. In this instance it is believed that the excess of either oxide substantially above the 1 to 1 ratio serves primarily as a promoter or carrier contributing to a minor extent to the catalytic activity.

The relative amount of active material in the carrier may of course also be varied over a range, and in certain instances it has proved necessary to do so in order to achieve the desired selectivity and activity for the gas stream with which the catalyst is utilized. In general, however, the weight percentage of the catalytically active material to total catalyst mass should be within the range of about 2.5 to about 15%. The most suitable amount of active material within this range depends upon several factors, such as, the cobalt to molybdenum ratio, the composition of the carrier, the composition of the gas stream to be treated, the degree of acetylene removal required, and the concomitants of temperature, pressure and space velocity.

The composition of the carrier material is very important because it has a marked effect upon the activity of the catalytically active material and because of the extremely rigorous treatment to which catalysts of this type are subjected in service. After a bed of such catalyst has been in use two or three weeks, polymer deposits are formed upon the surface which render the catalyst ineffective for the removal of acetylenes. These deposits may be burned off the catalyst by passing steam and air through the bed at a temperature of about 750° F., and within the bed the temperature may rise as high as 1200° F. due to the heat generated by oxidation of the polymer. This regenerative treatment usually involves a two or three day period, and considerable thermal shock to the catalyst occurs. Following the treatment the catalyst which has become oxidized must be reduced with hydrogen at a high temperature, and following such reduction the temperature is again lowered to the operating range of about 400 to 500° F. Few carrier materials will withstand such regeneration treatment without undergoing physical or chemical breakdown greatly shortening the catalyst life. Such regenerative treatment must be repeated every two or three weeks during the life of the catalyst and, if a catalyst is to be suitable for economical commercial use, it must have an effective life of from one to three years.

The carrier material of the catalyst of this invention is a mixture of clay and hydraulic cement with or without alumina. Various bonding clays such as kaolin, ball clay and certain refractory clays may be used, and various hydraulic cements such as Portland type cements and aluminous cements are satisfactory. The relative proportions of the ingredients in the carrier may be varied to some extent and still produce a quite satisfactory catalyst. For example, the amount of cement may vary from about 20% to about 85% of the weight of the carrier and the amount of clay may be varied from about 10% to about 50% of the weight of the carrier, while the amount of alumina in the carrier may vary from about 0 to about 40% and, if desired, other materials such as magnesite or talc may be added as substitutes for, or in addition to, the alumina. Tests have shown that the alumina may be either high or low grade material.

Certain of the following specific examples further illustrate the improved catalyst of our invention and the manner in which it may be produced and utilized.

*Example I*

A catalyst consisting of 4.4% cobalt-molybdena oxide complex supported on a cement, clay, alumina carrier was prepared in the following manner: A solution of ammonium paramolybdate and cobalt sulphate having equal molar proportions of cobalt and molybdenum was neutralized with sodium hydroxide as a precipitating agent. Precipitation was accomplished by adding sufficient sodium hydroxide to bring the pH within the range of 6.5 to 6.9. The resulting precipitate was washed, filtered and dried prior to incorporation in the carrier. X-ray diffraction studies of the precipitated, dried and reduced material indicated that it had the spinel crystal structure described above. The lattice constant was approximately 8.46 angstroms.

The dried filtrate was incorporated in the carrier by intimately mixing the following:

| | Parts by weight |
|---|---|
| Cobalt-molybdena | 5 |
| Alumina (hydrated) | 45 |
| Clay (Kentucky ball) | 20 |
| Portland cement | 30 |

A small amount of water was added during mixing to form a semi-plastic mass which was allowed to stand until it became partially dry. The partially dried material was then pelleted with the addition of 3% graphite as a lubricant into one-quarter inch diameter pellets with a Stokes pelleting machine. The pellets were then allowed to cure. A charge of this catalyst was placed in an isothermic reactor and was reduced for eight hours by passage of hydrogen gas at a temperature of about 850° F. through the charge. The temperature of the charge was then reduced to about 450° F. and a gas of the following composition was passed through the catalyst bed after having been passed through water at such temperature as to add 3.5% water vapor to the gas mixture.

| Component: | Mol percent |
|---|---|
| Butene | 0.2 |
| Butadiene | 0.5 |
| Acetylene | 0.4 |
| Propylene | 1.2 |
| Ethylene | 33 |
| Carbon monoxide | 1.4 |
| Hydrogen | 29.4 |
| Methane | 33.9 |

The pressure of the gas within the catalyst bed was 85 p.s.i.g. and the space velocity through the bed was 600 computed on a dry gas basis at 60° F. and 14.7 p.s.i.g. (Space velocity as used herein means: volumes of dry gas passing the catalyst bed per hour divided by the volume of the catalyst bed.) This test was conducted for 51 hours and the temperature of the gas in the catalyst bed varied from about 450 to about 500° F. The results of this test are tabulated below:

| Hours on stream | Bed temperature in degrees F. | Average acetylenes in effluent in parts per million |
|---|---|---|
| 4 | 457 | 5 |
| 24 | 459 | 30 |
| 27 | 502 | 15 |
| 29 | 508 | 15 |
| 51 | 502 | 15 |

Thus it will be seen that the acetylenes in the gas stream were virtually completely eliminated and that accordingly the catalyst is sufficiently active for the acetylene removal reaction. The effluent gas was analyzed from time to time for olefins and it was found that the average amount of olefins hydrogenated was less than 1.0% of the total olefins present. Accordingly, the catalyst is quite selective.

*Example II*

A catalyst similar to that of the foregoing example, except that an all alumina carrier was employed, was tested under identical conditions. This catalyst contained about 4.4% of the cobalt-molybdena prepared by precipitation in the same manner as described in Example I. Catalyst pellets were formed by admixing the following materials:

| | Parts by weight |
|---|---|
| Cobalt-molybdena | 12 |
| Alumina | 294 |
| Graphite | 9 |

The pellets were cured in air and were charged into an isothermal reactor and reduced with hydrogen as in Example I.

A gas having an identical composition as the gas in Example I was passed through the catalyst bed and the following acetylenes content were obtained upon analysis of the effluent:

| Hours on stream | Bed temperature in degrees F. | Acetylenes in effluent in parts per million |
|---|---|---|
| 4 | 451 | 70 |
| 24 | 463 | 90 |
| 27 | 504 | 90 |
| 29 | 495 | 70 |
| 51 | 497 | 70 |

The space velocity during this test was 600 as in the previous example. By comparing the amount of acetylenes in the effluent it will be seen that this catalyst is not nearly so active as the catalyst of Example I, the average acetylenes content of the effluent being approximately five times as great. Accordingly, the alumina carrier catalyst does not appear to be as effective as the catalyst having a cement and clay carrier.

*Example III*

A catalyst similar to that of Example I, but containing 20% cobalt-molybdena instead of 4.4% supported on a carrier of cement, clay and alumina, was charged in an isothermic reactor and reduced as in Example I. A gas of the following composition admixed with 5.6% steam was passed through the catalyst bed.

| Constituent: | Mol percent |
|---|---|
| Butene | 0.2 |
| Butadiene | 0.3 |
| Acetylene | 0.4 |
| Propylene | 1.2 |
| Ethylene | 33 |
| Carbon monoxide | 1.0 |
| Hydrogen | 29.4 |
| Methane | 34.5 |

This gas was conducted through the bed at a space velocity of 1000. The temperature of the bed was maintained between 220 and 450° F. The results of this test were as follows:

| Days on stream | Bed temperature, ° F. | Acetylene effluent in parts per million | Percent olefins hydrogenated |
|---|---|---|---|
| 1 | 270 | 14 | |
| 2 | 265 | 10 | 2.5 |
| 3 | 220 | 200 | 0 |
| 6 | 220 | 200 | 0 |
| 7 | 450 | 0 | 100 |

From the foregoing it will be apparent that this catalyst is not sufficiently selective. When the temperature was high enough for the catalyst to effect sufficient acetylene removal, the amount of olefins hydrogenated and therefore lost was excessive. On the other hand, when the temperature was lowered to such range that olefins were not hydrogenated the catalyst was not sufficiently active to effect removal of acetylenes. From this example it will be apparent that the relative amount of cobalt-molybdenum complex supported on the carrier should be less than 20%.

*Example IV*

A catalyst was prepared similar to the catalyst of Example I but containing approximately 10% cobalt-molybdena prepared by the method set forth in Example I. This catalyst was charged into an isothermal reactor and reduced as in Example I. A gas of the following composition was passed through the reactor at a space velocity of about 1000 and at a temperature varying between 450 and 500° F.

| Constituent: | Mol percent |
|---|---|
| Butene | 0.2 |
| Butadiene | 0.5 |
| Acetylene | 0.2 |
| Propylene | 6.0 |
| Ethylene | 20.3 |
| Carbon monoxide | 1.2 |
| Hydrogen | 21.0 |
| Methane | 44.1 |

The pressure was 200 p.s.i.g. The gas was passed through the catalyst bed for a period of eight days during which time it was found to effectively remove virtually all of the acetylene without undesirable hydrogenation of olefins. At the end of the eighth day approximately one grain of carbonyl sulfide (COS) was added for each 100 cubic feet of gas measured under standard conditions. Analysis of the outlet gas was made at various times from the eighth through the sixteenth day of the test and it was found that the average acetylene content of the effluent was somewhat less than 20 parts per million. Such analysis also indicated that none of the olefins were hydrogenated. From this example it is apparent that a catalyst containing 10% cobalt-molybdena complex on the cement, clay, alumina carrier is entirely satisfactory for use in purifying gas streams which are sulphur-free or which contain small amounts of sulphur compounds. Moreover, this catalyst maintained very good activity and selectivity with both gas streams.

*Example V*

A gas of the same composition as disclosed in the preceding example was passed through a reduced catalyst identical to that of the Example III and containing 20% cobalt-molybdena. Six grains of sulphur in the form of carbonyl sulfide (COS) per hundred standard cubic feet which was equivalent to 96 parts per million of sulphur were added to the gas stream in order to determine whether a catalyst containing 20% cobalt-molybdenum complex would be sufficiently selective for use with gas streams containing relatively large amounts of sulphur. The results of this test utilizing the sulphur containing gas stream were as follows:

| Days on stream | Bed temperature in degrees F. | Average acetylene in effluent in parts per million | Percent olefins hydrogenated |
|---|---|---|---|
| 1 | 450 | 5 | 4.1 |
| 1 | 450 | 5 | 5.1 |
| 4 | 600 | 5 | 3.2 |
| 4 | 600 | 5 | 4.2 |

From these data it will be apparent that the 20% active material catalyst is much too active to be selective even with gas streams containing large sulphur concentrations. Moreover, in order to determine whether the catalyst could be rendered effective by steaming, the bed was steamed for several hours at the start of the fourth day in order to reduce the catalyst's activity. Even after steaming, the percent of olefins hydrogenated was 3.2 indicating that the catalyst is not selective.

*Example VI*

To determine whether the catalyst of Example I, which consisted of 4.4% cobalt-molybdena on the cement, clay and alumina carrier, was suitable for use in removing acetylene from gas streams containing sulphur, the following gas stream was passed through a bed of the reduced catalyst of Example I:

| Component: | Mol percent |
|---|---|
| Acetylene | 0.4 |
| Butene | 0.2 |
| Butadiene | 0.5 |
| Propylene | 1.2 |
| Ethylene | 33.0 |
| Carbon monoxide | 1.4 |
| Hydrogen | 29.0 |
| Methane | 33.9 |

Carbonyl sulfide in an amount of two grains per hundred standard cubic feet of gas was added to the stream giving a sulphur content of about 16 p.p.m. The gas also contained about 5.5% water vapor.

The catalyst bed was activated by reduction as in Example I and the gas was conducted through the bed at a space velocity of 1000, a pressure of 85 p.s.i.g. and a temperature varying from 450° F. to 600° F. The results of this test were as follows:

| Hours on stream | Temperature in °F. | Average acetylenes in effluent in p.p.m. |
|---|---|---|
| 4 | 450 | 30 |
| 5 | 500 | 10 |
| 24½ | 500 | 30 |
| 31 | 550 | 30 |
| 49 | 550 | 55 |
| 53 | 550 | 30 |
| 76 | 580 | 32 |
| 98 | 600 | 15 |
| 100 | 600 | 10 |

Analysis of the effluent gas stream indicated that only 0.6 mol percent of the olefins were hydrogenated. Moreover, the cobalt-molybdena catalyst has been found to be effective in hydrogenating the carbonyl sulfide to compounds which are much more readily removable by conventional means. Thus this catalyst is also an effective desulfurization catalyst.

It will be noted from the above table that the average acetylene leakage was somewhat higher than that reported in Example I. This is due to the inhibiting effect of the sulphur upon the catalyst. At a temperature of about 600° F., however, the activity of the catalyst was sufficiently high to effectively remove all but ten to fifteen parts per million of the acetylene present.

*Example VII*

A catalyst containing about 14% by weight cobalt-molybdena and having a molar ratio of cobalt to molybdena of about 1 to 1.6 was prepared from the following ingredients:

| | Parts by weight |
|---|---|
| Cobalt nitrate hexahydrate ($Co(NO_3)_2.6H_2O$) | 13.5 |
| Molybdenum trioxide | 10.5 |
| Alumina monohydrate | 54.5 |
| Portland cement | 24 |
| Clay (Kentucky ball) | 16 |

The cobalt nitrate was diluted with tap water to such extent that the concentration of cobalt measured as cobalt oxide therein was 15%. This solution was admixed with the alumina and mulled for five minutes. The molybdenum trioxide was dissolved in approximately 15 parts by weight of 29% ammonia solution, and the resulting ammonium molybdate solution was added to the alumina-cobalt-nitrate mixture, and the whole admixture was mulled for five minutes more. The resulting pasty mass was then calcined in air for eight hours at 900° F. The calcined product was then cooled and mulled with the Portland cement and the clay. During this mulling stage sufficient water was added to produce a moist formable mass which was allowed to stand until it became partially dry. The partially dried mass was then pelleted with the addition of graphite as described in Example I. Catalyst produced as described above may be utilized to remove undesired impurities by catalytic reaction on gas streams containing organic sulphur compounds.

From the foregoing examples it will be readily apparent to those skilled in the art that a superior catalyst has been provided which is particularly well suited for the selective hydrogenation of acetylenes in gas streams containing olefins which it is not desired to hydrogenate. Moreover, the catalyst of this invention is quite suitable for gas streams which contain relatively large amounts of sulphur compounds which ordinarily act as catalyst poisons in such reactions.

Various changes and modifications in catalyst of this invention, such as will present themselves to those familiar with the art, may be made without departing from the spirit of this invention.

What is claimed is:

1. A shaped hydrogenation catalyst suitable for the selective hydrogenation of acetylene in the presence of olefins, said catalyst comprising finely divided cobalt-molybdena supported upon a carrier formed into catalyst shapes, the cobalt-molybdena being present in an amount between about 2.5 percent and about 15 percent by weight of the catalyst and the molal ratio of cobalt to molybdena being between about 1 to 3 and about 3 to 1, and the carrier comprising set hydraulic cement and bonding clay, the amount of cement being between about 20 percent and about 85 percent and the amount of clay being between about 10 percent and about 50 percent by weight of the carrier.

2. The catalyst of claim 1, the ratio of cobalt to molybdena being about 1 to 1 and the cobalt-molybdena being in such form as to have a spinel crystal structure upon reduction.

3. The catalyst of claim 1, the carrier comprising Portland cement, clay and alumina.

4. The catalyst of claim 1, the cobalt-molybdena having a spinel type crystal structure characterized by a lattice spacing of about 8.46 angstrom units determined by X-ray diffraction.

5. A shaped catalyst suitable for hydrogenation, said catalyst comprising finely divided cobalt-molybdena supported upon a carrier formed into catalyst shapes, the cobalt-molybdena being present in an amount between about 2.5% and about 15% by weight of the catalyst and the molal ratio of cobalt to molybdena being between about 1 to 3 and about 3 to 1, and the carrier comprising set hydraulic cement and bonding clay, the amount of cement being between about 20 percent and about 85 percent and the amount of clay being between about 10 percent and about 50 percent by weight of the carrier and said carrier also including alumina.

6. The catalyst of claim 5, the ratio of cobalt to molybdena being about 1 to 1.6 and the total cobalt-molybdena being about 14 percent by weight of the catalyst.

References Cited in the file of this patent

UNITED STATES PATENTS

| 2,625,519 | Hartig | Jan. 13, 1953 |
| 2,665,259 | Buffett | Jan. 5, 1954 |
| 2,687,381 | Hendricks | Aug. 24, 1954 |

OTHER REFERENCES

Catalysis by S. Berkman et al., Reinhold Publishing Co., N.Y., 1940, pages 473–477.